(12) United States Patent
Norimatsu

(10) Patent No.: US 6,389,303 B1
(45) Date of Patent: May 14, 2002

(54) BOOSTER FOR AMPLIFYING THE TRANSMISSION OUTPUT OF A HANDY PHONE

(75) Inventor: Hidehiko Norimatsu, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/240,259

(22) Filed: Jan. 29, 1999

(30) Foreign Application Priority Data

Jan. 30, 1998 (JP) .............................................. 10-018749

(51) Int. Cl.$^7$ .............................. H04B 1/40; H04M 1/00
(52) U.S. Cl. ........................ 455/571; 455/126; 455/115
(58) Field of Search ................................ 455/127, 571, 455/126, 115, 116, 550, 575

(56) References Cited

U.S. PATENT DOCUMENTS

| | | | |
|---|---|---|---|
| 5,048,117 A | * 9/1991 | Aisaka et al. ................ | 455/571 |
| 5,109,541 A | * 4/1992 | Park ........................... | 455/571 |
| 5,146,614 A | * 9/1992 | Furuno ........................ | 455/571 |
| 5,551,067 A | * 8/1996 | Hulkko et al. .............. | 455/571 |
| 5,659,893 A | * 8/1997 | Enoki et al. ................ | 455/127 |
| 5,995,813 A | * 11/1999 | Ishikura et al. ............ | 455/127 |

FOREIGN PATENT DOCUMENTS

| | | |
|---|---|---|
| JP | 3-20167 | 3/1991 |
| JP | 4-361430 | 12/1992 |
| JP | 7-226710 | 8/1995 |
| JP | 7-336243 | 12/1995 |
| JP | 8-195712 | 7/1996 |

* cited by examiner

Primary Examiner—Edward F. Urban
(74) Attorney, Agent, or Firm—Scully, Scott, Murphy & Presser

(57) ABSTRACT

A booster connectable to a handy phone for amplifying the transmission output of the phone is disclosed. A particular transmission message included in a transmission wave output from the phone and determining transmission power is decoded to generate a reference signal matching in level with the transmission power of the message. A variable gain power amplifier has its gain controlled such that the reference signal and the detected signal of the transmission wave output by the booster coincide with each other. As a result, the booster outputs power coincident with the transmission power determined by the particular transmission message. The booster makes it needless to inform the phone of the connection of the booster to the phone, and therefore obviates the need for extra connection lines and circuitry for detecting connection information. In addition, the booster is applicable to any kind of handy phone without regard to the manufacturer so long as a transmission wave includes a particular transmission message representative of transmission power.

4 Claims, 2 Drawing Sheets

BOOSTER FOR AMPLIFYING THE TRANSMISSION OUTPUT OF A HANDY PHONE

BACKGROUND OF THE INVENTION

The present invention relates to a booster for a handy phone and more particularly to a booster for amplifying the transmission output of a handy phone.

Handy phones in general are limited in battery capacity and heat radiation structure for implementing a light weight configuration and attractive appearance. Therefore, a transmission output available with a handy phone is smaller than the transmission output of a fixed communication apparatus. To increase the transmission output of a handy phone, it is a common practice to connect an exclusive booster to the phone. However, should the booster be simply connected to the handy phone, it would obstruct ventilation and would thereby generate excessive heat.

Japanese Patent Publication No. 3-20167, for example, discloses a device constructed to reduce the heat generation of a handy phone. The device includes a detecting circuit responsive to the connection of an exclusive booster to a handy phone. An automatic output power control circuit controls the transmission power of the phone to a preselected value relating to a reference voltage. The output of the detecting circuit is fed to a reference voltage generator included in the automatic output power control circuit for generating the above reference voltage, thereby varying the reference voltage. As a result, the output power of the phone is lowered to the minimum input necessary for the booster.

The device taught in the above document has some problems left unsolved, as follows. The device is not operable without the detecting circuit responsive to the connection of the booster to the phone. The detecting circuit needs extra connection lines because the connection of the booster to the phone is usually implemented by physical connection lines.

Assume that transmission power to be output from the booster changes when the booster is connected to the phone. Then, the class of a transmitter included in the phone and usually stored in the phone in relation to its identification must be changed from one provided when the phone is used alone. In addition, such a condition must be reported to a base station by using the replaced class. However, such information is not necessary when it comes to a booster applicable to a cellular system because the output power of the booster does not have to be changed from the original output power of the phone, i.e., the class of a transmitter does not have to be changed.

Further, the above detecting circuit will probably differ from one manufacturer to another manufacturer. It will therefore be difficult to connect devices put on the market by different manufacturers.

Technologies relating to the present invention are also disclosed in, e.g., Japanese Patent Laid-Open Publication Nos. 4-361430, 7-336243, 7-226710, and 8-195712.

SUMMARY OF THE INVENTION

It is therefore an object of the present invention to provide a booster for a handy phone eliminating the need for extra connection lines.

It is another object of the present invention to provide a booster connectable to any kind of handy phone.

A booster for a handy phone of the present invention includes a variable gain power amplifier for amplifying the power of a transmission wave output from the phone to which the booster is connected. A splitting section splits the transmission wave with the amplified power output from the variable gain power amplifier into two. A decoder decodes a particular transmission message included in the transmission wave split by the splitting section and determining transmission power to thereby output a reference signal matching in level with the transmission power. A detector detects the transmission wave with the amplified power output from the variable gain power amplifier. A controller compares the level of the reference signal output from the decoder and the level of a detected signal output from the detector and variably controls the gain of the variable gain power amplifier such that the reference signal and detected signal coincide with each other. A transmitting section transmits the transmission wave output from the splitting section by radio.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
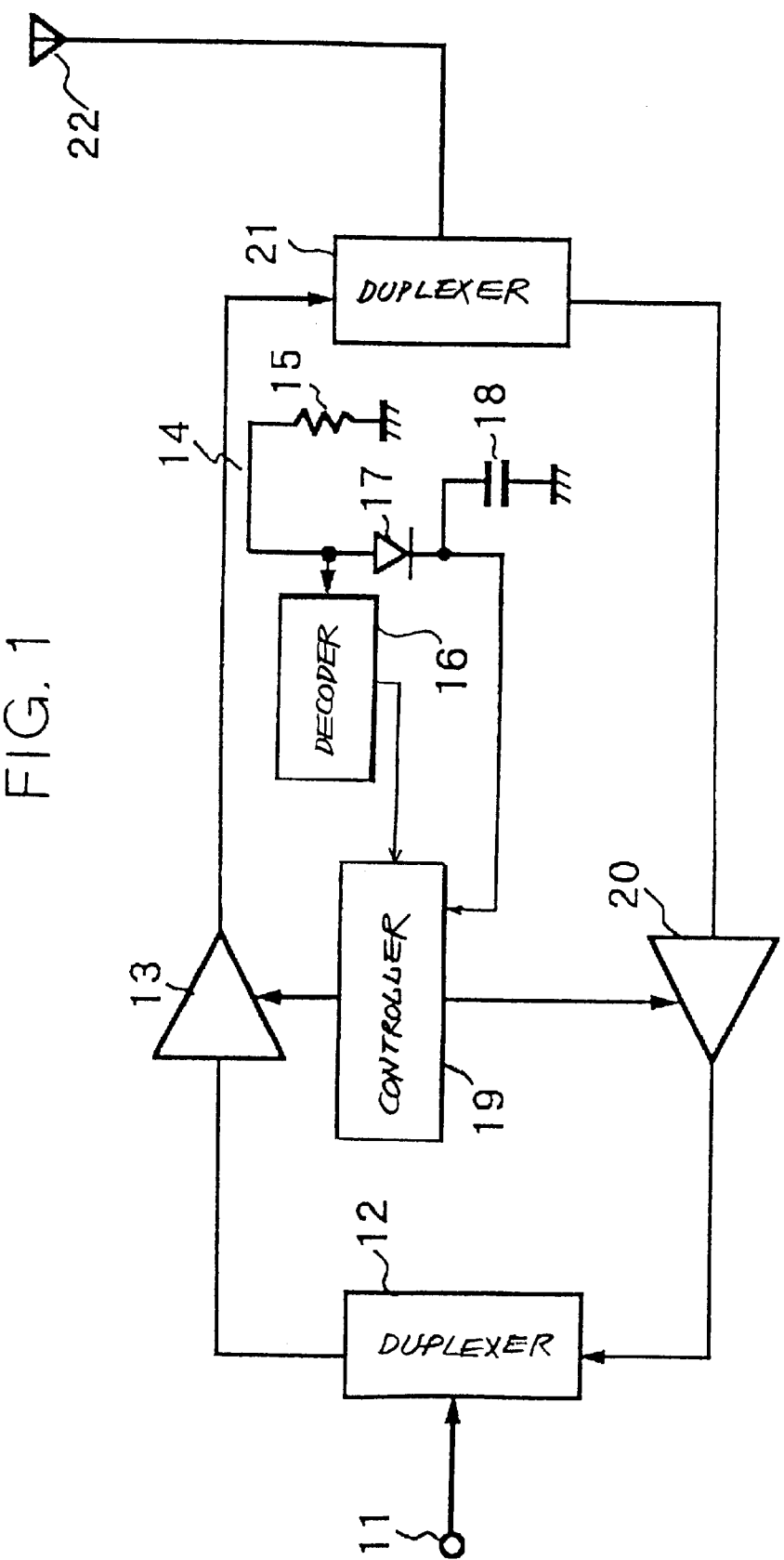
FIG. 1 is a block diagram schematically showing a booster for a handy phone embodying the present invention.

Referring TO FIG. 1 of the drawings, a booster for a handy phone embodying the present invention is shown. As shown, the booster includes a first duplexer 12 and a second duplexer 21 connected to a phone connection terminal 11 and an antenna 22, respectively. The first duplexer 12 is connected to a variable gain power amplifier 13 and a variable gain, low noise amplifier 20. A coupler 14 is connected to ground at one end of its secondary side via a resistor 15. A signal output from the coupler 14 is input to a decoder 16. A diode 17 and a capacitor 118 constitute a detector for detecting the output signal of the decoder 16. A controller 19 controls the entire booster.

A transmission wave output from a handy phone, not shown, is input to the booster connected to the handy phone via the phone connection terminal 11. The first duplexer 12 routes the transmission wave to the transmitting side, i.e., delivers it to the variable gain power amplifier 13. The power amplifier 13 amplifies the transmission wave with a gain controlled by the controller 19. The amplified transmission wave output from the power amplifier 13 is split into two by the coupler 14. One of the split waves is input to the second duplexer 21 while the other wave is input to the decoder 16. The decoder 16 decodes a message included in the input wave. At the same time, the detector made up of the diode 17 and capacitor 18 detects the envelope of the input wave.

The controller 19 receives the output of the decoder 16 and the output of the detector. In response, the controller 19 controls the gain of the variable gain power amplifier 13 and that of the variable gain, low noise amplifier 20 such that the detected signal level coincides with the result of decoding. The wave fed from the amplifier 13 to the second duplexer 21 is radiated via the antenna 22.

On the other hand, a wave sent from a remote station and come in through the antenna 22 is fed to the variable gain, low noise amplifier 20 via the second duplexer 21. The amplifier 20 amplifies the received wave with a gain controlled by the controller 19. The amplified wave output from the amplifier 20 is delivered to the handy phone via the first duplexer 12 and phone connection terminal 11.

Figure 2:
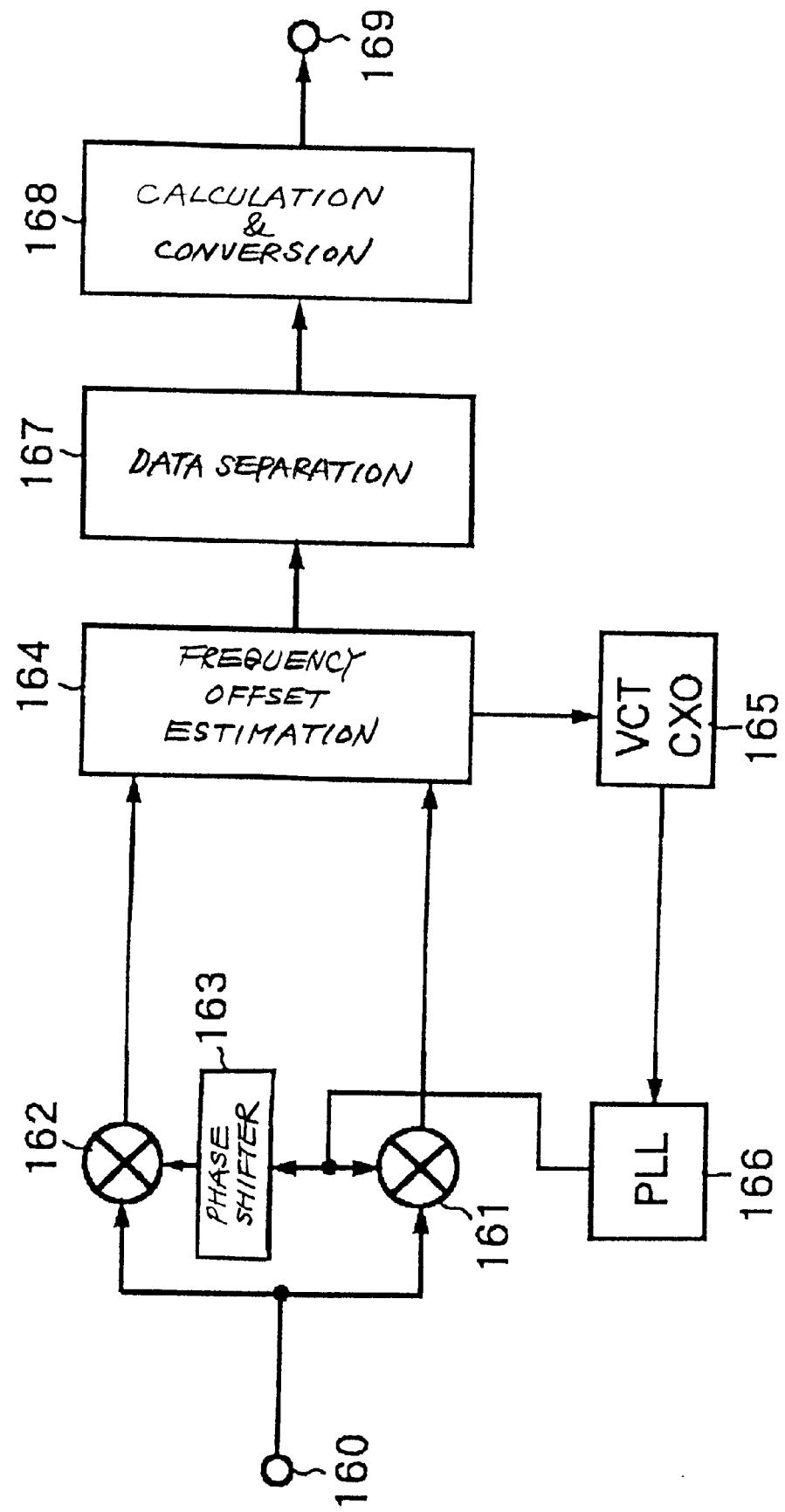
FIG. 2 is a schematic block diagram showing a specific configuration of a decoder included in the illustrative embodiment.

FIG. 2 shows a specific configuration of the decoder 16. As shown, the two split transmission waves are respectively applied to mixers 161 and 162 via an input terminal 160. A signal output from a PLL (Phase Locked Loop) 166 is applied to the mixer 161 and is applied to the mixer 162 via a phase shifter 163. The phase shifter 163 shifts the phase of the output of the PLL 166 by 90°. The mixers 161 and 162 execute quadrature demodulation with the input transmission waves by using the output of the PLL 166 and the output of the phase shifter 163, respectively. The resulting baseband signals output from the mixers 161 and 162 are input to a frequency offset estimation 164. The frequency offset estimation 164 outputs a frequency offset value based on the two baseband signals.

The above frequency offset value is fed back to a voltage controlled, temperature compensation type quartz oscillator (VCTCXO) 165 and then input to the PLL 166. The output oscillation frequency of the PLL 166 is therefore corrected by the frequency offset value. The output of the frequency offset estimation 164 is applied to a data separation 16 as well. The data separation 167 separates the transmission power of the phone or a parameter included in an algorithm for determining the transmission power and inputs the parameter to a calculation and conversion 168. The calculation and conversion 168 calculates, based on the input parameter, power to be actually transmitted from the phone and generates a reference voltage matching in level with the calculated power. The reference voltage is fed from the decoder 16 to the controller 19 via an output terminal 169.

A specific operation of the illustrative embodiment will be described with reference to FIGS. 1 and 2. In some handy phone systems, a handy phone or mobile station operated to send a wave to a base station sends its transmission power or a parameter used to calculate the transmission power to the base station either constantly or periodically. The base station uses such information to monitor the handy phone. For example, assume that the transmission level of the handy phone is high, but the level reaching the base station is low. Then, the base station determines that the distance between it and the handy phone has increased, and commands the phone to further raise the transmission level.

Usually, the above transmission power information has a preselected format. That is, information showing where and how (coding method) the transmission power information is written in transmission data is particular to the system and known beforehand. Therefore, the decoder 16 shown in FIGS. 1 and 2 is so constructed as to decode the above transmission power information. As shown in FIG. 2, the decoder 16 is similar in construction to a receiving section included in a conventional digital cellular mobile station. Although the PLL 166 must share the same frequency as the handy phone and must therefore search for a desired frequency by itself, this kind of technology is not directly relevant to the present invention and will not be described specifically.

The transmission wave is input to the mixers 161 and 162 via the input terminal 160, as stated with reference to FIG. 2. The mixers 161 and 162 execute quadrature demodulation with the input waves by using the output of the PLL 166 and the output of the phase sifter 163. The resulting baseband signals output from the mixers 161 and 162 are input to the frequency offset estimation 164. At this instant, the frequency offset estimation 164, for example, must be provided with an analog-to-digital conversion capability at its input side in order to implement digital signal processing to follow.

In the illustrative embodiment, the frequency offset estimation 164 determines a difference between a reference signal output from the modulation circuit of the handy phone and a reference signal output from the demodulation circuit of the booster by use of a conventional method. The different is fed back from the estimation 164 to the VCTCXO 165. As a result, the output oscillation frequency of the VCTCXO 165 is caused to coincide with the reference signal frequency of the handy phone and then input to the PLL 166. The PLL 166 multiplies the frequency of the input signal. The resulting output of the PLL 166 is directly fed to the mixer 161 as a carrier for demodulation and is fed to the mixer 162 after being shifted in phase by 90° by the phase shifter 163.

At the same time, the frequency offset estimation 164 delivers signals output from the mixers 161 and 162 and undergone quadrature demodulation to the data separation 167. The data separation 167 separates the transmission power information mentioned earlier and feeds it to the calculation and conversion 168. The calculation and conversion 168 calculates, based on the transmission power information, power to be actually transmitted from the handy phone, generates a reference voltage matching in level with the calculated power, and delivers the reference voltage to the controller 19, FIG. 1, via the output terminal 169.

The controller 19 compares the reference voltage and the detected voltage output from the detector made up of the diode 17 and capacitor 18. The detected voltage varies in accordance with the gain of the variable gain power amplifier 13. Therefore, the controller 19 outputs a control voltage for controlling the gain of the amplifier 13 such that the above detected voltage coincides with the reference voltage output from the decoder 16. The controller 19 may be implemented by conventional circuitry including, e.g., an operational amplifier.

The transmission wave amplified by the power amplifier 13 is radiated from the booster via the coupler 14, second duplexer 21, and antenna 22. At this instant, it is noteworthy that due to the control over the gain of the power amplifier 13, the power of the wave radiated via the antenna 22 has a value represented by the transmission power information included in the transmission wave.

Further, the controller 19 can see, based on the control voltage meant for the variable gain power amplifier 13, the gain of the amplifier 13. The controller 19 therefore sets a gain identical with the gain of the power amplifier 13 in the variable gain, low noise amplifier 20. As a result, the low-noise amplifier 20 amplifies a signal received via the antenna 22 and second duplexer 21 with the same gain as the power amplifier 13. The amplified received signal is routed through the first duplexer 12 and phone connection terminal 11 to the handy phone connected to the terminal 11. This successfully corrects the insertion loss of the above booster and handy phone connected together with respect to both of transmission and receipt.

As stated above, in the illustrative embodiment, the decoder 16 decodes a particular message determining the transmission power of the handy phone and included in a transmission wave output from the phone, thereby outputting a reference voltage. The booster causes the reference voltage and the detected voltage of the transmission wave output from the variable gain power amplifier 13 to coincide with each other. As a result, the transmission wave amplified by the power amplifier 13 is sent with transmission power determined by the above particular message. This makes it needless for information showing the connection of the booster to the phone to be input to the phone, and thereby eliminates the need for a circuit for detecting the connection of the booster and extra connection lines. Because connection lines are absent, the illustrative embodiment is applicable to any kind of handy phone.

In summary, it will be seen that the present invention provides a booster for a handy phone making it needless to inform the phone of the connection of the booster to the phone, and therefore obviating the need for connection lines and circuitry for detecting connection information. In addition, the booster of the present invention is applicable to any kind of handy phone without regard to the manufacturer so long as a transmission wave to be sent includes a particular message representative of transmission power.

Various modifications will become possible for those skilled in the art after receiving the teachings of the present disclosure without departing from the scope thereof. For example, the frequency offset estimation 164 may be omitted if the modulation system is not sensitive to frequency variation, i.e., if the oscillation frequency of the VCTCXO 165 can be confined in an allowable frequency deviation range.

What is claimed is:

1. A booster for a handy phone, comprising:
    a variable gain power amplifier for amplifying power of a transmission wave output from the handy phone to which said booster is connected; splitting means for splitting the transmission wave with amplified power output from said variable gain power amplifier into two;
    a decoder for decoding a particular transmission message included in the transmission wave split by said splitting means and determining transmission power to thereby output a reference signal matching in level with said transmission power, said decoder comprising a demodulating section for executing quadrature demodulation with the transmission wave output from said splitting means, a calculating and converting section for calculating transmission power of said particular transmission message output from a data separating section, and generating said reference signal matching in level with calculated transmission power, a frequency offset estimating section for determining, based on a demodulated signal output from said demodulating means, a difference in frequency between the handy phone and said reference signal, and correcting means for correcting, in response to an output signal of said frequency offset estimating section, a frequency of a carrier meant for said demodulating means;
    a detector for detecting the transmission wave with amplified power output from said variable gain power amplifier;
    a controller for comparing a level of said reference signal output from said decoder and a level of a detected signal output from said detector and variably controlling a gain of said variable gain power amplifier such that said reference signal and said detected signal coincide with each other; and
    a transmitting means for transmitting the transmission wave output from said splitting means by radio.

2. A booster as claimed in claim 1, further comprising a variable gain, low noise amplifier for receipt, said controller variably controlling a gain of said variable gain low noise amplifier in accordance with the gain of said variable gain power amplifier.

3. A booster as claimed in claim 2, further comprising:
    a first duplexer for selectively connecting an input terminal of said variable gain power amplifier and an input terminal of said variable gain, low lose amplifier to a phone connection terminal connected to the handy phone; and
    a second duplexer for selectively connecting an output terminal of said variable gain power amplifier and an output terminal of said variable gain, low noise amplifier to a transmit/receive antenna.

4. A booster as claimed in claim 1, wherein said detector detects an envelope of transmission wave split by said splitting means and then input to said decoder.

* * * * *